(12) United States Patent
    Kudelski

(10) Patent No.: US 9,348,983 B2
(45) Date of Patent: May 24, 2016

(54) METHOD FOR CONTROLLING THE ACCESS TO A SPECIFIC TYPE OF SERVICES AND AUTHENTICATION DEVICE FOR CONTROLLING THE ACCESS TO SUCH TYPE OF SERVICES

(71) Applicant: NAGRAVISION S.A., Cheseaux-sur-Lausanne (CH)

(72) Inventor: Henri Kudelski, Puidoux (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 5 days.

(21) Appl. No.: 14/303,901

(22) Filed: Jun. 13, 2014

(65) Prior Publication Data
    US 2014/0373131 A1    Dec. 18, 2014

(30) Foreign Application Priority Data
    Jun. 14, 2013    (EP) ..................................... 13172080

(51) Int. Cl.
    *G06F 12/14*    (2006.01)
    *G06F 21/31*    (2013.01)
    *G06F 21/34*    (2013.01)

(52) U.S. Cl.
    CPC ................ *G06F 21/31* (2013.01); *G06F 21/34* (2013.01); *G06F 2221/2103* (2013.01)

(58) Field of Classification Search
    None
    See application file for complete search history.

(56) References Cited

U.S. PATENT DOCUMENTS

| | | | |
|---|---|---|---|
| 5,668,876 A | 9/1997 | Falk et al. | |
| 7,181,017 B1 * | 2/2007 | Nagel et al. | 380/282 |
| 2009/0287837 A1 * | 11/2009 | Felsher | 709/229 |

FOREIGN PATENT DOCUMENTS

WO    WO 96/00485    1/1996

OTHER PUBLICATIONS

European Search Report issued in EP 13 17 2080 dated Dec. 4, 2013.
Il-Hyun Kim, "Analyze Von Authentisierungs-Verfahren fur Online Accounts", downloaded from http://www-ti.informatik.uni-teubingen.de/~borchert/Troja/studdiplfiles/Kim.pdf, Feb. 15, 2012 (174 pages).
Partial English language translation of Il-Hyun Kim, "Analyze Von Authentisierungs-Verfahren fur Online Accounts", downloaded from http://www-ti.informatik.uni-teubingen.de/~borchert/Troja/stud-diplfiles/Kim.pdf, Feb. 15, 2012 (5 pages).

* cited by examiner

*Primary Examiner* — Brandon Hoffman
(74) *Attorney, Agent, or Firm* — DLA Piper LLP US

(57) ABSTRACT

A method and device for controlling access to a specific type of services among a plurality of type of services proposed by a service supplier. The method includes entering, into an authentication device of the user, a personal identification code specific to the user, the personal identification code being identical for at least two different types of services proposed by the service supplier; and indicating, by said user, said specific type of services for which the access is required, the indication being made in the authentication device. The method further comprises transforming said personal identification code, in a way depending on a cryptographic function specific to said user and to said required specific type of services, the cryptographic function being memorized in the authentication device; transmitting the result of the transformation of said personal identification code to the service supplier; authenticating the user by the service supplier by means of the transmitted result of said transformation, and assigning an access right according to the result of the authentication. The device implements the record.

20 Claims, 2 Drawing Sheets

METHOD FOR CONTROLLING THE ACCESS TO A SPECIFIC TYPE OF SERVICES AND AUTHENTICATION DEVICE FOR CONTROLLING THE ACCESS TO SUCH TYPE OF SERVICES

CROSS REFERENCE TO RELATED APPLICATIONS

This application claims priority under 35 U.S.C. Section. 119 to European patent application N° EP13172080.7, entitled "Method for controlling the access to a specific type of services and authentication device for controlling the access to such type of services" filed Jun. 14, 2013, the contents of which are hereby incorporated by reference herein.

TECHNICAL FIELD

The present invention relates to a method for controlling access to a specific type of services among a plurality of types of services proposed by a service supplier.

More particularly, this method allows to ensure that the service supplier attributes rights corresponding to the type of services required by a user and not rights with a broader scope than those allowing the access to this specific type of services.

The invention also concerns an authentication device for controlling the access to such services.

PRIOR ART

Presently, many services are proposed by service providers, these being generally accessible on-line from terminals particularly such as personal computers. For a large number of these services, it is necessary to have an access right and to be identified by the supplier. The access right is often given to the owner of an authentication device, which can have the form of a card of the credit card type, or a device having for example the form of a calculator. This calculator contains at least a processor and a memory, in order to be able to carry out cryptographic operations, as well as an interface allowing the user to interact with this authentication device. The identification is done generally starting from a password and/or a personal identification code introduced by the user in the terminal by means of an interface such as a digital or alphanumeric keyboard.

Among the access providers proposing the type of services as exposed above, there are in particular banks and other financial institutions. The proposed services are in particular payments, possibly in different currencies, and the consultation of the owner's currency account balance.

When a user wishes to access a service, for example for checking his account balance at a determined bank, he generally starts identifying himself. This can be done for example on the website of that bank. According to a method largely used, when the user has identified himself, a sequence of alphanumeric characters is displayed on the terminal. The user must copy this sequence of alphanumeric characters on the authentication device that he owns. The authentication device generates a new sequence of alphanumeric characters that the user must copy on the terminal, for example on the website of the bank for which access is requested. The authentication device can be a specific device having only this authentication function or can also be a device specific to the user and having other functions, such as for instance, a mobile phone or a touchpad.

The generation of the new sequence of alphanumeric characters by the authentication device takes place starting from the first sequence of alphanumeric characters generated by the supplier and from a cryptographic function specific to the user. The expression "cryptographic function" covers a set of elements that allow encrypting data. This includes in particular an algorithm and an encryption key. According to the algorithm chosen, this set can combine other elements such as an initialization vector for example. This cryptographic function is known both by the service supplier and by the authentication device. The same calculation is carried out by the authentication device and by the service supplier. If the calculation leads to an identical result in both entities, the access to the required service is authorized, the user being considered as authenticated. In the other case, the access is denied.

With this kind of devices, the sequence of alphanumeric characters generated by the service supplier is unique and different for each connection. Once a sequence of characters has been used, it becomes unusable for an ill-intentioned person.

In the existing systems, the providers generally propose several different services. Typically, the same supplier can propose to carry out payments in several currencies and the consultation of the state of one or more accounts of the owner. Other services can also be conceived, these services being generally defined as services related to payments on the one hand, and services for viewing the balance of an account used for these payments on the other hand.

The payment services for example, can be related to the purchase of access rights to pay-TV events, mobile phone network services, purchase of on-line products, etc.

Payments require a reading and writing operation and thus an adapted authorization. The simple consultation of the state of an account usually only requires a reading authorization. If the terminal used is hacked so as to simulate a page of the website of the bank that the user wishes to consult, the hacker could carry out a payment operation requiring a read/write authorization even if the user only wants to consult the state of his accounts, which only requires a reading authorization.

The piracy cases comprise in particular the case where the user's terminal contains a virus allowing a third party to access to information related to the use of the terminal, the case where communications between the terminal and the service supplier are intercepted by a third party (known under the expression of "Man in the middle") and the case where a third party claims to be the service supplier (phishing).

The aim of this invention is to reduce the risk for the user in case of piracy, by preventing all operations requiring a read/write permission when the user only needs a read permission. More generally, the aim of the invention is to attribute rights corresponding to the service the user wishes to access and not more extended or different rights.

DISCLOSURE OF THE INVENTION

The object of the invention is reached by a method for controlling access to a specific type of services among a plurality of types of services proposed by a service supplier, the method comprising:

entering, by an authentication device of a user, a personal identification code specific to the user, the personal identification code being identical for at least two different types of services proposed by the service supplier;

reviewing by the authentication device, from said user, an indication of a specific type of services for which the access is required;

transforming said personal identification code in the authentication device, in a way depending on at least one cryptographic function specific to the user and to the required specific type of services, the cryptographic function being memorized in the authentication device;

transmitting the result of the transformation of said personal identification code to the service supplier; and receiving, from the service provider, an access right corresponding to the required specific type of service.

The object of the invention is also reached by an authentication device for controlling the access to a specific type of services among a plurality of types of services proposed by a service supplier, this device comprising;

at least a processor;

a memory connected to the processor, the memory being arranged for performing at least two distinct cryptographic functions; and an interface connected to the processor and configured to select at least one type of services among said plurality of services.

This invention is applied if the user has the choice between different services or types of services requiring different rights applied to a same set of data. The invention allows ensuring that the rights provided by the service supplier to a user who requires the access to a specific service effectively correspond to the rights necessary and sufficient to access the required service. In this way, if a third party claims to be a service supplier or usurps the identity of an authorized user, he will not be allowed to realize operations or access services requiring more extended rights than those necessary for accessing the services required by the user. In particular, it is not possible for a hacker to access services such as on-line payments when the user only wants to access the visualization of the status of his accounts.

This invention is essentially applied when a user accesses services of the service supplier from a terminal such as a computer, connected to this supplier by means of a computer network such as the Internet. The user has to be registered with this supplier to have access to the services. To each user corresponds a data set such as for example his accounts registered with the service supplier.

The method according to the invention allows attributing to a same set of data, different rights according to the type of services the user wishes to access, a type of service corresponding to a type of use of these data. The invention is thus not intended to enable a determined user to access different data units depending on the required service, but rather different services that use the same set of data for a determined user.

BRIEF DESCRIPTION OF THE DRAWINGS

This invention and its advantages will be better understood with reference to the enclosed drawings and the detailed description of a particular embodiment, in which.

EMBODIMENTS OF THE INVENTION

Figure 1:
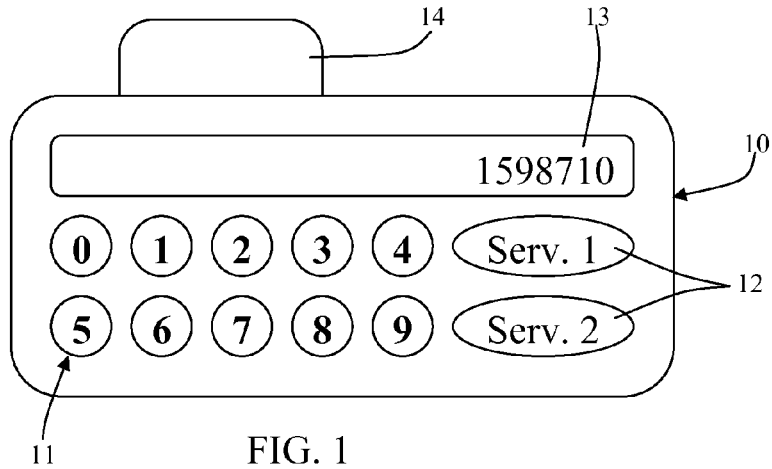
FIG. 1 is a view of an authentication device of the invention.

With reference to the figures, it is supposed that a user having an authentication device 10 such as illustrated by FIG. 1 has the possibility to access different services or types of services proposed by a bank. The proposed services can be for instance, the payment from an account, the transfer of an amount from the account of a user to another account of the same user, the consultation of the state of an account, etc.

The types of services can be grouped according to the rights needed to access these services. For example, the operations requiring a read/write permission, such as payments, money transfer, on-line purchases, . . . are grouped in a first type of services. The operations requiring only a read permission, like the consultation of an account or of a balance account, are grouped in a second type of services. In the examples described here, only these two types of services have been defined. It is clear that the invention is not limited to these examples. Two similar operations, for example the transfer of an amount from a user account towards two different destination accounts, are not considered as different types of services.

The authentication device disclosed in FIG. 1 has the form of a housing including an alphanumeric keyboard 11, selection keys 12 allowing the selection of the services proposed by the supplier, a display 13 and generally, but not necessarily, a reader for cards of the smart card type arranged for receiving a security module which is represented here in the form of a smart card 14.

The authentication device 10 further comprises a processor and a memory able to carry out at least one cryptographic function for each type of service accessible by the user. For this purpose, the authentication device can contain several different keys and/or several different encryption algorithms, possibly an ordered list of initialization vectors, etc. Different cryptographic functions are defined as functions leading to different results when they are applied to the same initial value or the same set of initial values.

If the authentication device comprises a card reader, the user's corresponding card is considered as being part of the authentication device 10.

In the different examples described, the user connects remotely to the service supplier, for instance by accessing a website from a to computer terminal.

Example 1

Figure 2:
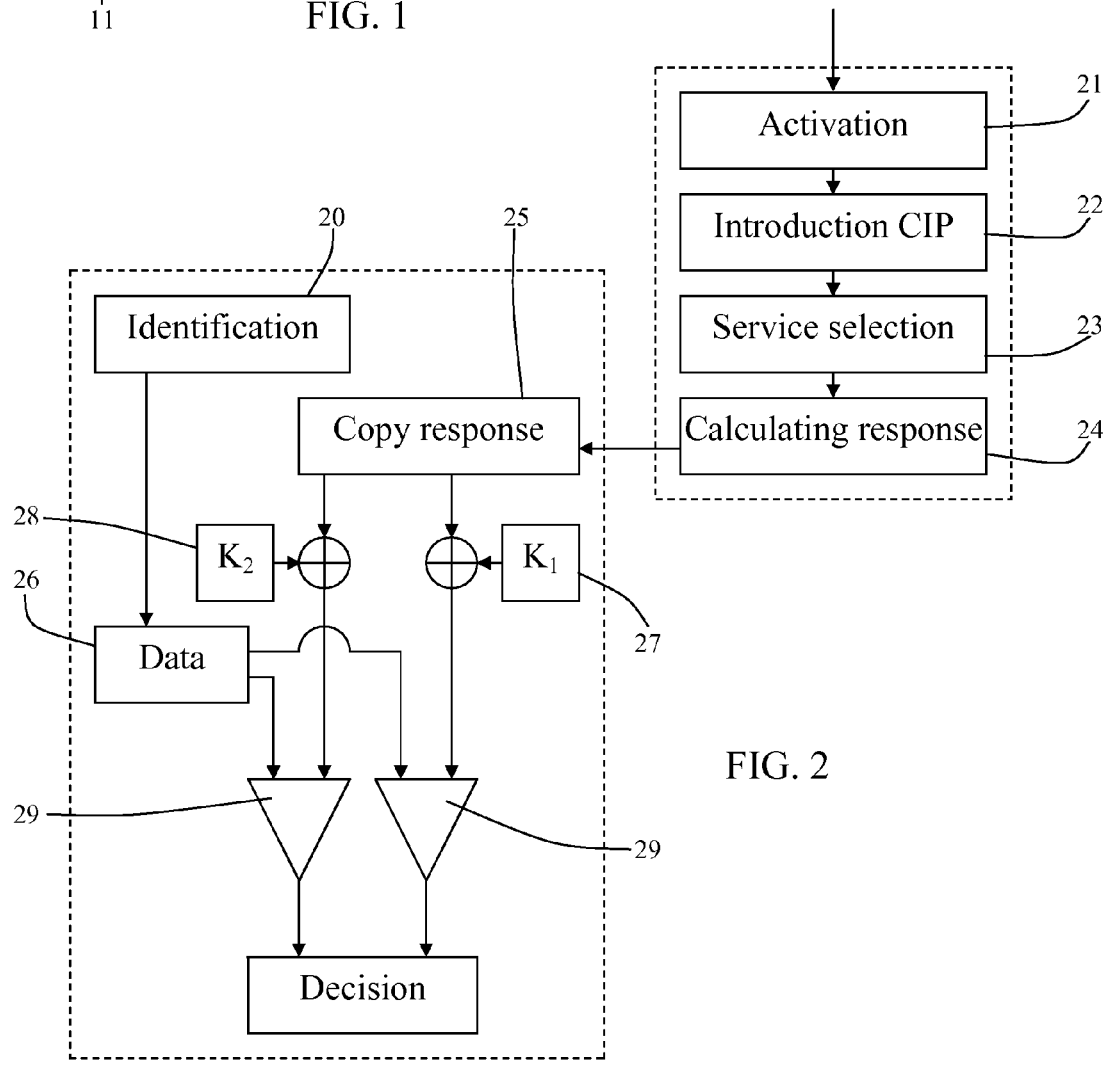
FIG. 2 is a schematic view of a first embodiment of the method of the invention.

This example is described with reference to FIG. 2. When the user has connected to the service supplier through its website, said user will thus have to identify himself at the site. This identification, corresponding to a step 20 in FIG. 2, can be made in a conventional way, by means of an identification name and/or number for example. At this stage, the bank may ask for a complementary identifier such as a contract number for example.

If the contract number corresponds to the identifier of the person, the method can proceed. On the other hand, if the contract number does not correspond to the identifier indicated before, an error message can be displayed to the user. It is possible for example to let the user try three different identifiers before blocking the access to the service. If the user does not need to introduce a complementary identifier, a successful identification is sufficient for continuing the method.

At the same time, the user has to activate his authentication device, in a step 21. This can be done in various ways. According to one of them, a smart card is introduced in the reader of the authentication device. The user introduces an activation code or a password by means of the alphanumeric keyboard. It is then verified if this activation code corresponds to a code memorized in the authentication device, i.e. either in a memory of the card or in a memory integrated in the housing.

It should be noted that generally, passwords are not memorized in clear, but in an encrypted form. In a conventional way, what is memorized is the result of a one-way function applied to the password. When the authentication device is activated, the user is asked to introduce a personal identification code in a step 22.

Another way to activate the authentication device consists of entering the personal identification code directly, without previously entering a password.

The personal identification code is introduced by means of an interface such as the alphanumeric keyboard 11 of the authentication device 10. This code or a derivative of this code can be memorized in the authentication device. If the personal identification code introduced by the user corresponds to the memorized code, the method can proceed. In a conventional way, the user usually has three possibilities for entering a correct code before the device is blocked and prevents further use.

When the authentication device is active and the user has introduced his personal identification code, the user has to select, in a step 23, the type of service he wants to access. For this purpose, the authentication device comprises means for selecting a service or a type of services the user wishes to access. In the illustrated embodiment, the authentication device comprises two keys 12, one for carrying out a payment, which requires a read/write permission, and the other for consulting the account statement, which only requires a read permission. The user thus indicates, by pressing on the corresponding key, which service he wishes to access.

The authentication device comprises a cryptographic function associated to each service or type of services, or in other words, a cryptographic function associated to each of the service selection keys. The selection by the user of the type of services he wishes to access thus allows determining the cryptographic function that will be used for carrying on the method.

This method proceeds with the calculation of a response in a step 24. This response depends at least on the personal identification code and on the cryptographic function corresponding to the type of services selected by the user. It can also take into account other parameters. This response can be calculated in many different ways, well known by the person skilled in the art. For example, the response could be a key hash of the personal identification code, the key being a key specific to the cryptographic function determined during the step of selection of the type of services or a key derived from the latter.

The response is displayed on the display of the authentication device, generally in the form of an alphanumeric code.

The response displayed on the authentication device then has to be copied, in a step 25, on the website of the service supplier. This response can be copied manually or transmitted by a local communication means to the terminal in communication with the service supplier. The transmission can be made by means of a wired or wireless connection such as Bluetooth.

The supplier has to carry out the user authentication. For this purpose he has identification data 26 which have been introduced during the user's connection to the service supplier. These identification data allow the supplier to know the different parameters usable by the authentication device to calculate a response. These parameters are at least the user's personal identification code and the cryptographic functions associated to this user.

In the example disclosed in FIG. 1, the service supplier cannot determine which cryptographic function has been used by the authentication device.

The service supplier calculates several responses, i.e. one response per cryptographic function associated to the concerned authentication device. He thus obtains two different results if the authentication device has two different cryptographic functions 27, 28. Each of the results is compared, in a step 29, with the result that the user has introduced from the authentication device. If one of these two results leads to an identity, the service supplier determines which of the cryptographic functions has led to this identity. The access to the services associated to the cryptographic function having led to this identity is authorized. It is clear that if none of the keys leads to an identity, the access to the services is refused.

According to a variant, it is possible that the service supplier calculates a first response and then compares the result obtained with the response of the authentication device. If these results are identical, he does not calculate the second response. If the results are not identical, the service supplier calculates a response with another cryptographic function and compares the result with the response coming from the authentication device. He thus proceeds until either he has obtained a response identical to the response of the identification device, or he has tested all the cryptographic functions available for this user. If none of the cryptographic functions gives a positive result of the comparison, the access to the service is denied.

Example 2

Figure 3:
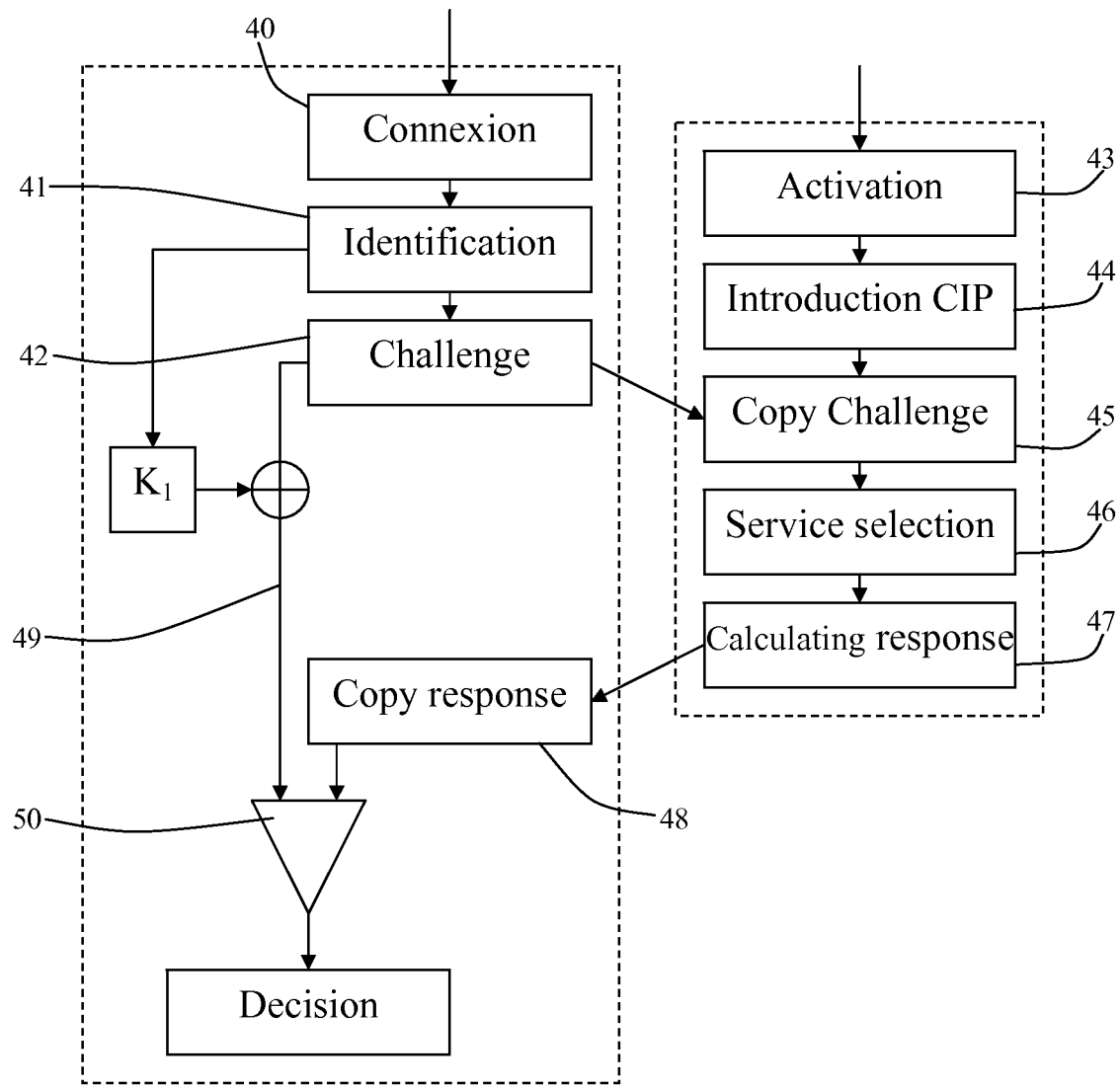
FIG. 3 represents, in the form of a block diagram, a second embodiment of the method of the invention.

According to the embodiment described in this example and illustrated by FIG. 3, the user connects remotely to the service supplier, in a step 40, for example by accessing a website from a computer terminal. He then identifies himself on this site in a step 41. This identification can be made in a conventional way, by means of a name and/or of an identification number for example. At this stage, it is possible that the user has to enter a complementary identifier such as a contract number.

If the contract number corresponds to the identifier of the person, the method can proceed. On the contrary, if the contract number does not correspond to the identifier indicated before, an error message can be displayed to the user. If there is no contract number to be introduced, the identification alone is sufficient.

When the bank has identified the user, the terminal displays an alphanumeric code called "Challenge" that can be a random value generated by the service supplier. This corresponds to a step 42.

At the same time, in a step 43, the user has to activate his authentication device as in the previous example, i.e. at least introduce his personal identification code in a step 44. If the personal identification code introduced by the user is correct, the method can proceed. According to a variant, the correctness of the personal identification code is verified by comparing this code to a code memorized in the authentication device. According to a preferred variant, the personal identification code is not memorized in clear in the authentication device. The authentication device rather stores a value resulting from an operation on this personal identification code. This operation can typically be a one-way function like a hash function. In this way, even if an ill-intentioned person succeeds in reading the value stored in the authentication device, he cannot deduce the personal identification code.

When the authentication device is active and the personal identification code has been introduced correctly, the user has to introduce the "Challenge" by means of the interface. This "Challenge" can be manually copied by the user or can be transmitted by communication means. This corresponds to a step 45. For example the challenge can be received by remote communication means such as a mobile phone, a local communication such as of the Bluetooth or infrared type, or a wired communication like USB for example.

When the user has copied the challenge, he has to select the desired service, in a step 46. For this purpose, he proceeds like in the embodiment explained in example 1, using the selection keys.

As in the previous example, the authentication device comprises a cryptographic function associated to each service or type of services or in other words, a cryptographic function associated to each of the service selection keys. The selection by the user, of the type of services he wishes to access thus allows determining the cryptographic function that will be used for the next step of the method.

The method proceeds with the calculation of a response to the "Challenge", in a step 47. This response is a function that depends at least on the "Challenge" and on the encryption key determined during the selection of the type of services required by the user. It can also take into account other parameters. In particular, the response usually takes into account the personal identification code introduced by the user. According to a particular embodiment, it can also comprise a user account or contract number. This response can be calculated in many different ways, well known by the person skilled in the art. As an example, the function could be a key hash of the "Challenge" and of the personal identification code, the key being the one determined during the selection step 46 of the type of services or a key derived from the latter. To this response the authentication device may add a data which function is to indicate which type of services has been selected by the user, or in other words, which key has been used during the calculation of the response to the "Challenge". The response to which said data has been added is called here "extended response" and its utility is explained in more detail below.

The response or, as in this example, the extended response is displayed on the display of the authentication device, generally in the form of an alphanumeric code.

The extended response displayed on the authentication device then has to be copied, in a step 48, on the website of the service supplier.

To obtain this extended response, many variants are imaginable. One of it consists in adding a specific field that can contain two distinct values, for example 0 or 1, to the result of the function of calculation of the response to the "Challenge". More generally, the field should be able to contain at least so many distinct values as there are possible cryptographic functions or different service types. According to a variant, it is possible that the field contains a bit that can be set to zero or one and which transforms the result of this function into an even or odd value, an even value corresponding to a first cryptographic function or a first type of service and an odd value corresponding to a second cryptographic function or a second type of services.

If the field directly indicates which cryptographic function has been used by the authentication device, the service supplier has to read the value of this field and will immediately know which cryptographic function he has to use. If the field is used to act on parity, the service supplier can determine that, if the value of the result is even, the user has chosen a first type of services corresponding to a first cryptographic function, while if the result is odd, he has chosen a second type of service corresponding to a second cryptographic function.

It is clear that many different ways are imaginable to indicate which cryptographic function has been used by the authentication device.

It should be noted that, conventionally, the calculations are carried out in binary mode. The "Challenge" and the response are instead displayed in alphanumeric form. Thus, there is a conversion from binary mode into alphanumeric mode. The additional field used for indicating the cryptographic function to be used is thus not visible as such by the user.

If the service supplier can determine which type of service has been chosen by the user, which corresponds to the case in which the information introduced on the site of the service supplier is the "extended" response, this supplier will be able to determine which cryptographic function is associated to this kind of services. The service supplier can thus use this cryptographic function to calculate a response to the "Challenge", by applying the same function applied by the authentication device. This corresponds to a step 49. The service supplier can thus compare the result obtained by calculation with the result copied from the authentication device or more precisely with that part of the augmented result from which the added data has been suppressed. This corresponds to a step 50. If these results are identical, the access to a service corresponding to the type of services chosen by the user is authorized. In case of no identity of the results, the access to the services is in principle refused.

Generally, at least one element depends on the service or type of services to which the user wishes to access, said element remains the same for each connection to this service or type of service. This element can be, among other, a user identifier, an activation code, a password or a cryptographic function. It should be noted that several of these elements can remain identical for each connection to a given service.

The method according to the invention ensures greater security during the access to operations requiring an important security level, typically financial operations. Indeed, thanks to this method, the user can ask for the most restrictive rights he needs, which allows to prevent a third party from using more extended rights to carry out operations that the legitimate user does not wish to carry out.

The invention claimed is:

1. A method for controlling access to a specific type of services among a plurality of types of services proposed by a service supplier, a type of service comprising services requiring the same access rights to access the services, the method comprising:
   entering, by an authentication device of a user, a personal identification code specific to the user, the personal identification code being identical for at least two different services of a same type of service proposed by the service supplier;
   receiving by the authentication device, from said user, an indication of a specific type of services for which the access is required;
   transforming said personal identification code in the authentication device, in a way depending on at least one cryptographic function specific to the user and on the required specific type of services, the cryptographic function being memorized in the authentication device;
   transmitting the result of the transformation of said personal identification code to the service supplier; and
   receiving, from the service provider, an access right corresponding to the required specific type of service.

2. The method of claim 1, further comprising:
   authenticating the user by the service supplier, by means of the transmitted result of said transformation;
   assigning or refusing to assign, by the service supplier, an access right to said specific type of services required according to the result of the authentication.

3. The method for controlling access according to claim 1, wherein said cryptographic function comprises at least one encryption key and one encryption algorithm and in that the transformation step of the personal identification code depending on the cryptographic function comprises the encryption of said personal identification code by this cryptographic function.

4. The method for controlling access according to claim 2, wherein said method further comprises introducing, into the authentication device, a challenge received from the service supplier, and wherein the step of transforming said personal identification code comprises calculating a response which depends at least on said personal identification code, on said cryptographic function specific to said specific type of service selected by the user and on said challenge.

5. The method for controlling access according to claim 2, wherein the result of the transformation contains an indication allowing the service supplier to determine which specific service has been selected by the user.

6. The method for controlling access according to claim 5, wherein the step of authenticating the user by the service supplier comprises the following steps:
  reading the indication allowing the service supplier to determine which specific type of services has been selected by the user;
  selecting, by the service supplier, the cryptographic function specific to said user and to said specific type of services;
  calculating, by the service supplier, the transformation of said personal identification code by means of the selected cryptographic function;
  comparing the value calculated by the service supplier with the value received from the authentication device;
  authorizing access to said specific type of service if these values are equal, and refusing access if these values are different.

7. The method for controlling access according to claim 2, further comprising:
  a) calculating, by the service supplier, the transformation of said personal identification code by means of a first cryptographic function specific to said user and to said specific type of services;
  b) comparing the value calculated by the service supplier with the value received from the authentication device;
  c) authorizing access to said specific type of services if the value calculated by the supplier and the value received by from the authentication device are equal;
  d) if the value calculated by the supplier and the value received by from the authentication device are different, repeating steps a) to c) using a different cryptographic function during each iteration;
  e) if none of the cryptographic functions specific to the types of services proposed by the service supplier leads to an equality, refusing access to the services of the service supplier.

8. The method for controlling the access according to claim 2, further comprising:
  calculating, by the service supplier, the transformation of said personal identification code by means of the different cryptographic functions specific to said user and to said service types proposed by said service supplier;
  comparing the values calculated by the service supplier and the value received from the authentication device; and
  authorizing access to said specific type of services if the value received from the authentication device corresponds to one of the values calculated by said service supplier, and refusing the access to the services of the service supplier if the value received from the authentication device does not correspond to any of the values calculated by said service supplier.

9. The method for controlling access according to claim 4, wherein the result of the transformation contains an indication allowing the service supplier to determine which specific service has been selected by the user.

10. The method for controlling access according to claim 9, wherein the step of authenticating the user by the service supplier comprises:
  reading the indication allowing the service supplier to determine which specific type of services has been selected by the user;
  selecting, by the service supplier, the cryptographic function specific to said user and to said specific type of services;
  calculating, by the service supplier, the transformation of said personal identification code by means of the selected cryptographic function;
  comparing the value calculated by the service supplier with the value received from the authentication device; and
  authorizing access to said specific type of service if these values are equal, and refusing access if these values are different.

11. The method for controlling access according to claim 4, further comprising:
  a) calculating, by the service supplier, the transformation of said personal identification code using a first cryptographic function specific to said user and to said specific type of services;
  b) comparing the value calculated by the service supplier with the value received from the authentication device;
  c) authorizing access to said specific type of services if the value calculated by the service supplier is equal to the value received by from the authentication device;
  d) if the value calculated by the service supplier is equal to the value received by from the authentication device are different, repeating steps a) to c) using a different cryptographic function during each iteration;
  e) if none of the cryptographic functions specific to the types of services proposed by the service supplier leads to an equality, refusing of access to the services of the service supplier.

12. The method for controlling access according to claim 4, further comprising:
  calculating, by the service supplier, the transformation of said personal identification code suing different cryptographic functions specific to said user and to said service types proposed by said service supplier;
  comparing the value calculated by the service supplier and the value received from the authentication device;
  authorizing access to said specific type of services if the value received from the authentication device corresponds to one of the values calculated by said service supplier, and refusing access to the services of the service supplier if the value received from the authentication device does not correspond to any of the values calculated by said service supplier.

13. The method for controlling access according to claim 4, wherein the step of transmitting the result of the transformation of said personal identification code to the service supplier comprises copying the response to the challenge on a terminal connected to the service supplier.

14. The method for controlling access according to claim 1, wherein a type of services comprises several different services.

15. The method for controlling access according to claim 1, wherein a type of services comprises one service.

16. An authentication device for controlling the access to a specific type of services among a plurality of types of services proposed by a service supplier, a type of services comprising the services requiring same access rights to access the services, the authentication device comprising;
- at least a processor;
- a memory connected to the processor, the memory storing at least two distinct cryptographic functions; and
- an interface connected to the processor and configured to select at least one type of services among said plurality of types of services;
- wherein the processor is configured to perform one of the distinct cryptographic functions based on a selected type of service.

17. The authentication device according to claim 16, wherein said memory contains at least one personal authentication code.

18. The authentication device according to claim 16, wherein said memory contains at least two distinct encryption keys and at least one encryption algorithm.

19. The authentication device according to claim 16, wherein said memory contains at least one encryption key and at least two different encryption algorithms.

20. The authentication device according to claim 16, wherein said interface is configurable to introduce a challenge received by a service supplier.

\* \* \* \* \*